US012785798B2

(12) United States Patent
Breuer

(10) Patent No.: US 12,785,798 B2

(45) Date of Patent: Nov. 3, 2026

(54) NTN BASED ON VLOS SEPARATED RADIO AND CORE/BASE STATION NETWORK CONTROL

(71) Applicant: Telit Cinterion Deutschland GmbH, Munich (DE)

(72) Inventor: Volker Breuer, Boetzow (DE)

(73) Assignee: Telit Cinterion Deutschland GmbH, Munich (DE)

( * ) Notice: Subject to any disclaimer, the term of this patent is extended or adjusted under 35 U.S.C. 154(b) by 236 days.

(21) Appl. No.: 18/822,325

(22) Filed: Sep. 2, 2024

(65) Prior Publication Data

US 2025/0080215 A1 Mar. 6, 2025

(30) Foreign Application Priority Data

Sep. 6, 2023 (EP) .................................... 23195646

(51) Int. Cl.

*H04B 7/185* (2006.01)
*H04L 1/1812* (2023.01)

(52) U.S. Cl.

CPC ..... *H04B 7/18586* (2013.01); *H04B 7/18597* (2013.01); *H04L 1/1812* (2013.01)

(58) Field of Classification Search

CPC ............ H04B 7/18586; H04B 7/18597; H04B 7/18521; H04B 7/18513; H04B 7/18519; H04B 7/18573; H04L 1/1812

See application file for complete search history.

(56) References Cited

U.S. PATENT DOCUMENTS

| | | | | |
|---|---|---|---|---|
| 2012/0263042 | A1 | 10/2012 | Fauconnier et al. | |
| 2018/0084476 | A1* | 3/2018 | Kay .................. | H04B 7/18521 |
| 2021/0281318 | A1 | 9/2021 | Chen et al. | |

(Continued)

FOREIGN PATENT DOCUMENTS

| | | |
|---|---|---|
| CN | 115473569 | 12/2022 |
| CN | 115549754 | 12/2022 |

(Continued)

OTHER PUBLICATIONS

3GPP TR 38.821 "3rd Generation Partnership Project; Technical Specification Group Radio Access Network; Solutions for NR to support non-terrestrial networks (NTN)", Release 16, May 2021.

(Continued)

*Primary Examiner* — Ashley Shivers

(74) *Attorney, Agent, or Firm* — PEARL COHEN LLP

(57) ABSTRACT

Systems and methods for communication include: a user equipment "UE"; a first satellite having a first orbit defined by a first radius; a plurality of second satellites each having a second orbit, each second orbit defined by a second radius, wherein each second radius is less than the first radius; and a terrestrially located core network element, the first satellite adapted to send a setup request to the terrestrially located core network element and configure a sequence of second satellites of the plurality of second satellites according to a coverage area, wherein the sequence of second satellites is adapted to provide a first user data connection between the UE and the terrestrially located core network element, and wherein the first satellite is further adapted to iteratively update the sequence of second satellites based on a changing coverage area.

14 Claims, 8 Drawing Sheets

(56) References Cited

U.S. PATENT DOCUMENTS

| | | | | |
|---|---|---|---|---|
| 2022/0109496 A1* | 4/2022 | Shrestha | ............ | H04B 7/18519 |
| 2025/0126653 A1* | 4/2025 | Penev | ............... | H04W 74/0833 |
| 2026/0040276 A1* | 2/2026 | Hu | ..................... | H04B 7/18521 |
| 2026/0056330 A1* | 2/2026 | Tao | ......................... | G01S 19/14 |

FOREIGN PATENT DOCUMENTS

| | | |
|---|---|---|
| EP | 3513596 B1 | 7/2021 |
| EP | 4250817 | 9/2023 |
| JP | 2013-541912 | 11/2013 |
| JP | 2021-536696 | 12/2021 |
| JP | 2023-523923 | 6/2023 |
| JP | 2023-528652 | 7/2023 |
| WO | WO2022/143563 | 7/2022 |

OTHER PUBLICATIONS

3GPP TS 38.101-4 “3rd Generation Partnership Project; Technical Specification Group Radio Access Network; NR; User Equipment (UE) radio transmission and reception; Part 4: Performance requirements” Release 17, Sep. 2022.

3GPP TS 38.304 “3rd Generation Partnership Project; Technical Specification Group Radio Access Network; NR; User Equipment (UE) procedures in Idle mode and RRC Inactive state” Release 17, Sep. 2022.

3GPP TSG RAN Meeting #86 RP-193153, “NGMN 5G Non-Terrestrial Networks Position Paper”, NGMN Alliance Project Extreme Long Range Communications for Deep Rural Coverage (incl. airborne solutions),Dec. 6, 2019.

* cited by examiner

NTN BASED ON VLOS SEPARATED RADIO AND CORE/BASE STATION NETWORK CONTROL

CROSS REFERENCE TO RELATED APPLICATIONS

This application claims priority to European Patent Application No. 23195646.7 filed on Sep. 6, 2023, which is hereby incorporated by reference.

FIELD OF THE INVENTION

The invention relates generally to non-terrestrial networks (NTNs), in particular control and user plane separation in NTNs comprising satellites of different orbits.

BACKGROUND

The further evolution of non-terrestrial networks (NTNs) in 5G and/or 6G has been announced by many companies. Several verticals including automotive, drones, tracking, and railway industry request higher throughput for several of their scenarios so that they can reliably be served by NTN. The current NTN network/cell capability is in the several Mbit range for LEO (Low Earth Orbit) with VSAT (very small aperture terminal). To increase throughput concepts on VLOS (Very Low Orbit Satellites) are considered.

Embodiments of the invention aim to address expected challenges in VLOS satellite constellations, particularly for 3GPP and 6G evolution.

BRIEF SUMMARY OF THE INVENTION

According to one or more embodiments of the invention, there is provided a method for communication, the method comprising: sending, by a first satellite, to a terrestrially located core network element, a setup request from a user equipment "UE"; configuring, by the first satellite and based on a setup configuration received from the terrestrially located core network element, a sequence of second satellites of a plurality of second satellites according to a coverage area of the sequence of second satellites and a location of the UE and the terrestrially located core network element with respect to the coverage area, the sequence of second satellites comprising a serving satellite to serve the UE; providing, by the sequence of second satellites, a first user data connection between the UE and the terrestrially located core network element; and iteratively updating, by the first satellite, the sequence of second satellites based on a changing coverage area of the sequence of second satellites, wherein the updating comprises configuring a second satellite of the plurality of second satellites to become a new serving satellite comprised in the sequence when a coverage area of an existing serving satellite no longer includes the UE, and configuring a second satellite of the plurality of second satellites having a coverage area which includes the terrestrially located core network element to be comprised in the sequence if no second satellite currently in the sequence has a coverage area which includes the terrestrially located core network element, wherein the first satellite has a first orbit defined by a first radius, and wherein each satellite of the plurality of second satellites has a second orbit, each second orbit defined by a second radius, wherein each second radius is less than the first radius.

According to some embodiments, the plurality of second satellites are very low earth orbit "VLEO" satellites.

According to some embodiments the first satellite is one of: a low earth orbit "LEO" satellite, or a geosynchronous equatorial orbit "GEO" satellite.

According to some embodiments, the method further includes maintaining, by the first satellite, a further user data connection with the UE, and sending data via the further user data connection if the first user data connection is lost.

According to some embodiments, the first user data connection has the functionalities of a secondary user plane and the further user data connection has the functionalities of a primary user plane.

According to some embodiments, the method further includes preventing camping of the UE on the sequence of second satellites.

According to some embodiments, the first satellite is an anchor cell for the UE.

According to some embodiments, at least one second satellite of the plurality of second satellites is a non-anchor cell for the UE.

According to some embodiments, the method further includes performing, by the first satellite, non-access stratum signaling "NAS" with the UE.

According to some embodiments, providing the first user data connection between the UE and the terrestrially located core network element comprises communication via inter-satellite link "ISL" between satellites comprised in the sequence.

According to some embodiments, the method further includes performing an inter-satellite hybrid automatic repeat request "HARQ" process, the inter-satellite HARQ process comprising sending user data and information related to generating a HARQ redundancy version, by the serving satellite, to an adjacent second satellite of the sequence prior to the coverage area of the serving satellite no longer including the UE.

According to some embodiments, the method includes monitoring, by the UE, the first satellite when the UE is in idle mode.

According to some embodiments, at least two of the plurality of second satellites are operated by different mobile network providers "MNOs".

According to one or more embodiments of the invention, there is provided a system for communication, the system comprising:

- a user equipment "UE";
- a first satellite having a first orbit defined by a first radius;
- a plurality of second satellites each having a second orbit, each second orbit defined by a second radius, wherein each second radius is less than the first radius; and
- a terrestrially located core network element, wherein the first satellite is adapted to, in response to a setup request from the UE:

- send the setup request to the terrestrially located core network element; and
- configure, based on a setup configuration received from the terrestrially located core network element, a sequence of second satellites of the plurality of second satellites according to a coverage area of the sequence of second satellites and a location of the UE and terrestrially located core network element with respect to the coverage area, the sequence of second satellites comprising a serving satellite to serve the UE, wherein the sequence of second satellites is adapted to provide a first user data connection between the UE and the terrestrially located core network element, and wherein the first satellite is further adapted to: iteratively update the sequence of second satellites based on a changing coverage area of the sequence of second satellites, by configuring a second satellite of the plurality of second satellites to become a new serving satellite comprised in the sequence when a coverage area of an existing serving satellite no longer includes the UE, and configuring a second satellite of the plurality of second satellites having a coverage area which includes the terrestrially located core network element to be comprised in the sequence if no second satellite currently in the sequence has a coverage area which includes the terrestrially located core network element.

According to one or more embodiments, there is provided a satellite adapted to perform the role of a first satellite in the above-described method.

According to one or more embodiments, there is provided a satellite adapted to perform the role of a second satellite in the above-described method.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, may be understood by reference to the following detailed description when read with the accompanied drawings. Embodiments are illustrated without limitation in the figures, in which like reference numerals indicate corresponding, analogous, or similar elements, and in which:

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Embodiments of the invention use different satellites in different orbits. Very Low Earth Orbit (VLEO) satellites, also referred to herein as Very Low Orbit Satellites (VLOS satellites), typically orbit at an altitude below 400-450 km, such as at a height of 350 km above the planet's surface. In contrast, Low Earth Orbit (LEO) satellites typically orbit at a height of 600-1400 km.

Another type of satellite which may be used by embodiments of the invention are geostationary/geosynchronous satellites, having a geosynchronous orbit (sometimes referred to as a geosynchronous equatorial orbit), and which may be referred to as a GEO satellite. GEO satellites typically orbit at 35,786 km in altitude above the Earth's equator and have an orbital period equal to that of the Earth's rotational period, thus appearing at a stationary fixed position to a ground-based observer.

As used herein, LEO and/or GEO satellites may be referred to as having a "higher" orbit (e.g. than VLEO/VLOS satellites), and VLEO/VLOS satellites may be referred to as having a "lower" orbit (e.g. than LEO and/or GEO satellites), for example because LEO and/or GEO satellites orbit at a greater distance from the centre of the Earth than VLEO/VLOS satellites.

Figure 1:
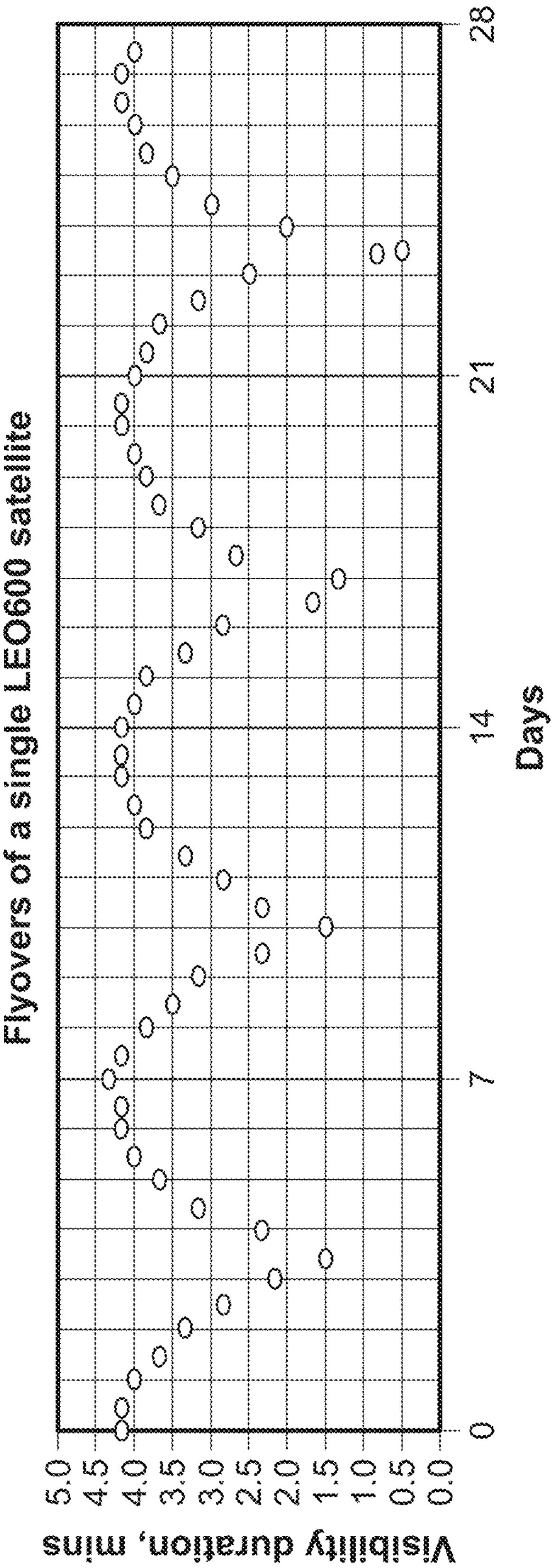
FIG. 1 shows an example of the visibility duration of a single LEO satellite orbiting at 600 km.

FIG. 1 shows an example of the visibility duration of a single LEO satellite orbiting at 600 km. As can be seen, the flyovers of the satellite have a peak visibility duration of approximately 4 minutes, decreasing to a minimum visibility duration of approximately 1.5 minutes.

VLEO satellites typically have a smaller cell diameter than an LEO satellite, and the smaller distance between a VLEO satellite and a user equipment (UE), such as a cell phone, on the planet's surface may allow for a data throughput in the 100 Mbits region, compared to the 0.1-1.5 Mbits throughput for a user equipment communicating with an LEO satellite (depending on antenna and scenario). However, a drawback of VLEO satellites is their increased speed due to their lower altitude, and thus a VLEO satellite does not remain visible (e.g. for communication with the user equipment) for as long as with an LEO satellite.

LEO satellites already play an important role in idle mode procedures of a user equipment (e.g. in 3GPP, TR38.821, TS38.101-4, TS38.304 Rel.-17), where the LEO satellite moves at a speed relative to a user of a high speed train and remain visible only for 2-5 minutes every 12 hours. Connectivity maintenance has so far been a challenge identified for LEO NTN-NR connectivity, for example see TR38.821:

7.3.2.1.4 Frequent and Unavoidable Handover

Satellites in non-GEO orbits move with high speed relative to a fixed position on earth, leading to frequent and unavoidable handover for both stationary and moving UEs. This may result in significant signaling overhead and impact power consumption, as well as exacerbating other potential challenges related to mobility e.g. service interruption due to signaling latency . . . . From the above analysis, it is concluded that HO frequency in LEO NTN can be similar to that experienced by a terrestrial UE on a high-speed train, however this represents a worst-case scenario and is not indicative of a typical terrestrial network. It is not anticipated that frequent HO will occur in GEO due to large cell size limiting the impact of UE speed. It is further assumed in LEO scenarios UE speed is a negligible factor in HO frequency given the relative speed of the satellite, and this will principally be an issue for LEO with moving beams.

The inventors have identified that the situation will be further exacerbated due to the typically far higher speed of VLEO satellites and their smaller cell diameter (as compared to LEO satellites), and so existing idle mode/architecture procedures will fail considering the different speed and visibility of VLEO satellites.

Figure 2A:
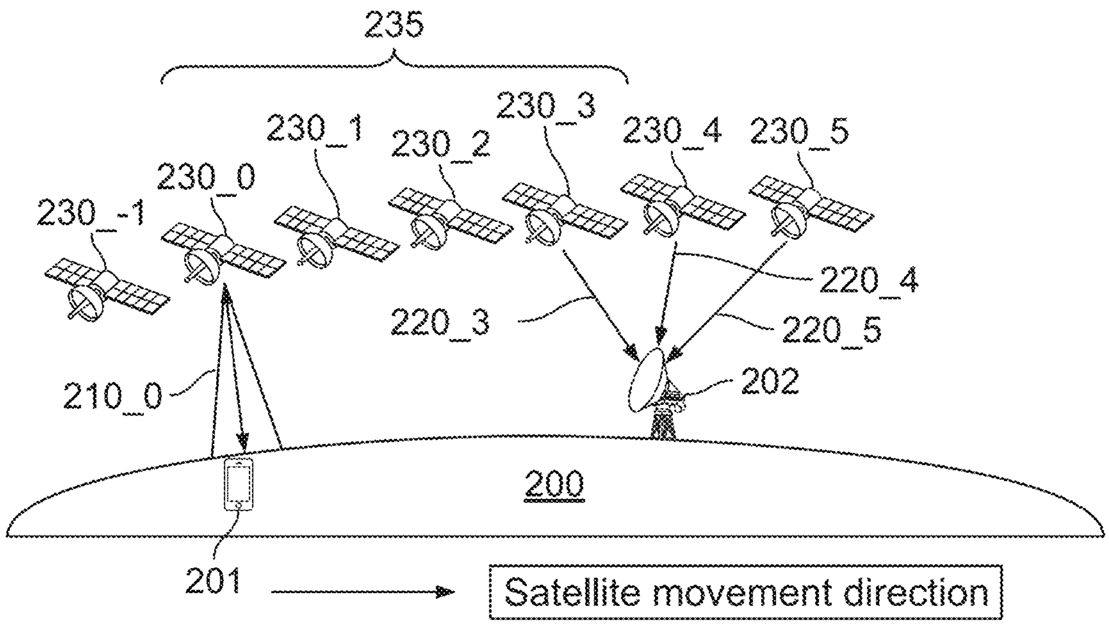
FIGS. 2A and 2B show an example movement of very low orbit satellites.

For example, as can be seen in FIG. 2A, very low orbit satellites 230_-1, 230_0, 230_1, 230_2, and 230_3, 230_4, and 230_5 (which may be referred to as satellites 230_*n*, n being an index, or merely satellites 230) orbit above terrestrial surface 200, which may be, for example, the surface of the Earth.

Satellite 230_0 has a coverage area 210_0 which includes a user equipment 201, and satellite 230_0 may send and receive signals to and from user equipment 201.

Satellites 230_3, 230_4, and 230_5 are within range of (e.g. have a coverage area, not shown, which includes) a terrestrially located core network element 202, and may send and receive signals to and from core network element 202. For example, satellite 230_3 can send and receive signals 220_3 to and from core network element 202, satellite 230_4 can send and receive signals 220_4 to and from core network element 202, and satellite 230_5 can send and receive signals 220_5 to and from core network element 202.

Satellites 230_0, 230_1, 230_2, and 230_3 form a sequence 235 of satellite hops from user equipment 201 to terrestrially located core network element 202 (e.g. the satellites form a chain of connections). Sequence 235 is shown as a minimal sequence, since satellites 230_4 and 230_5 are also within range of core network element 202, but are not shown as included in sequence 235.

Figure 2B:
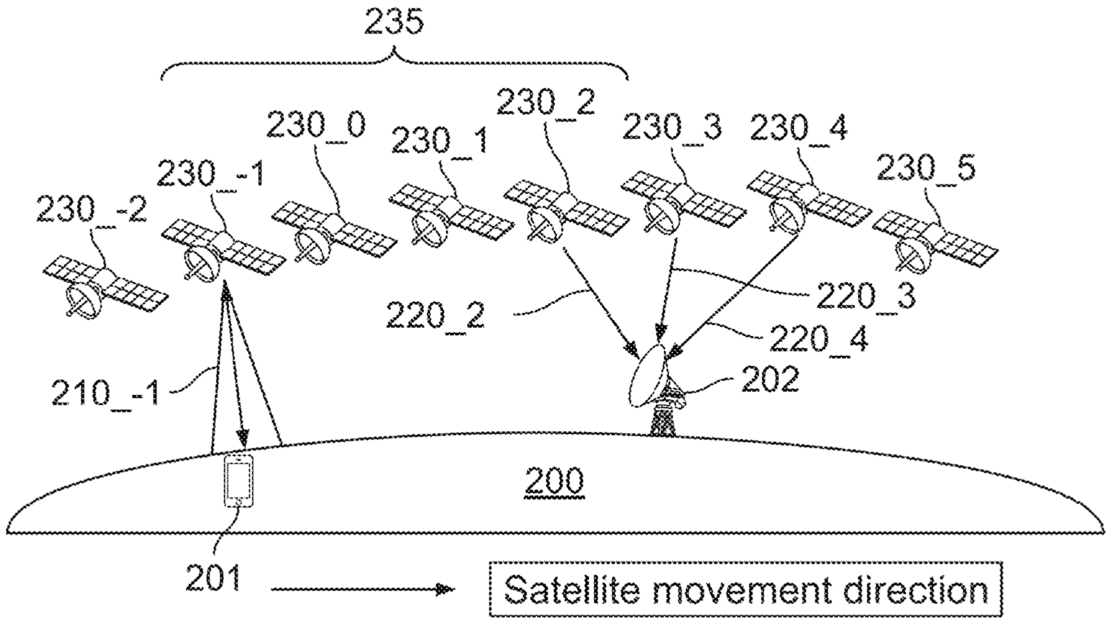

FIG. 2B shows a later point in time where VLOS satellites 230_-1, 230_0, 230_1, 230_2, 230_3, 230_4 and 230_5 have moved over the terrestrial surface 200 (in the figures the satellite movement direction is shown as moving left to right). Satellite 230_-2 has "moved in" from the left and represents the cyclical visibility of the satellites, since the satellite was not "visible" (e.g. to an observer/user equipment proximal at the location shown) at the point in time shown in FIG. 2A.

Coverage area 210_0 from satellite 230_0 which included user equipment 201 at the point in time shown in FIG. 2A has moved along with satellite 230_0 (not shown in FIG. 2B) so as to no longer include user equipment 201 at the point in time shown in FIG. 2B. Satellite 230_-1 has moved so that its coverage area 210_-1 does now include user equipment 201.

Similarly, satellite 230_2 has come within range of core network element 202 and can send and receive signals 220_2 to and from core network element 202. Satellite 230_5 has moved out of range of core network element 202 and can no longer send and receive signals to core network element 202.

The (minimal) sequence 235 of satellite hops connecting user equipment 201 and core network element 202 now comprises satellites 230_-1, 230_0, 230_1, and 230_2.

Thus for any satellite network in a lower orbit with cells having smaller diameter and satellites moving faster (also increasing doppler) handover and connection stability becomes more of an issue. For example, as shown between FIGS. 2A and 2B, satellite 230_0 has had to handover connection to user equipment 201 to satellite 230_-1. Subsequent handovers will be required, for example from satellite 230_-1 to satellite 230_-2 as the satellites orbit, which due to be very low earth orbit satellites, will happen more frequently compared to a LEO satellite due to the increased orbital velocity.

If handover density in LEO is comparable to high-speed train handovers, handover speed for VLOS constellations are rather in the range of a jet-plane speed neglecting UE's own movement.

However, as discussed, many satellites flying in lower orbit has the potential to increase throughput and spectrum efficiency. Thus, to boost capacity and address the above-identified problems, multi-orbit constellations including inter-working with exiting LEO or GEO satellites are proposed by embodiments of the invention, which may increase capacity and throughput using a novel 3D (e.g. multi-orbit) network architecture, and which may be natively part of 6G systems.

Embodiments of the invention address the link maintenance, e.g. keeping the connectivity alive, even at a lower rate. The problem as depicted in FIGS. 2A and 2B is further explained, and solutions according to embodiments of the invention are presented in, FIGS. 3A and 3B.

Accordingly, a problem which the invention may solve may be formulated as how to balance the increased data throughput of using VLEO/VLOS satellites with the increased handover frequency.

Embodiments of the invention solve the problem by locating the core network functionality in a satellite of higher orbit (e.g. GEO or LEO), which has the advantage of being stable, but the drawback of not having as high a throughput. Hence, embodiments of the invention further include a constellation (e.g. a 3D network) of VLOS orbit satellites to provide a connection orchestrated by the higher orbit satellite covering the area momentarily. The lower orbit satellites provide the data user plane functionality orchestrated by the higher orbit control functions, thereby achieving control and user plane separation (CUPS). For example, the higher orbit satellite possesses core functionality and is aware which is the next satellite to provide service and which satellites are needed in a connection for backlink to Earth, and hence can provide the respective information to said satellites. The lower orbit satellites effectively operate merely as data pumps, with the higher orbit satellite handling connection control and configuration, and as such the lower orbit satellites may only be used when the UE is operating in connected mode (including discontinuous transmission "DTX" and suspended situations). Accordingly, the lower orbit satellites do not need to perform non-access stratum signaling (NAS) procedures such as paging while the UE is in idle mode. This also means that SIB (system information block) provisioning if any beyond SSB (Synchronization signal block) or CD-SSB (cell defining SSB) is present is done to a limited level. For example, lower orbit satellites may only provide SSB-CD so that the satellite can be identified, with usage clarified via ISL (inter-satellite link) during satellite chain initialization (e.g. configuration from the first satellite).

Thus, since LEO satellites (or even satellites in higher orbits such as GEO satellites) move less frequently with respect to the UE, they may form a constant serving base suitable for core network signaling being less time critical and for keeping the general UE connectivity alive.

Embodiments of the invention may improve existing networks being used for verticals such as automotive, tracking, and/or first responder (see, for example, NTN 4V2X in 5GAA: 5G Automotive Association) and may provide robust architecture to maintain connectivity for use cases such as tele-operated driving, drone control, etc.

Figure 3A:
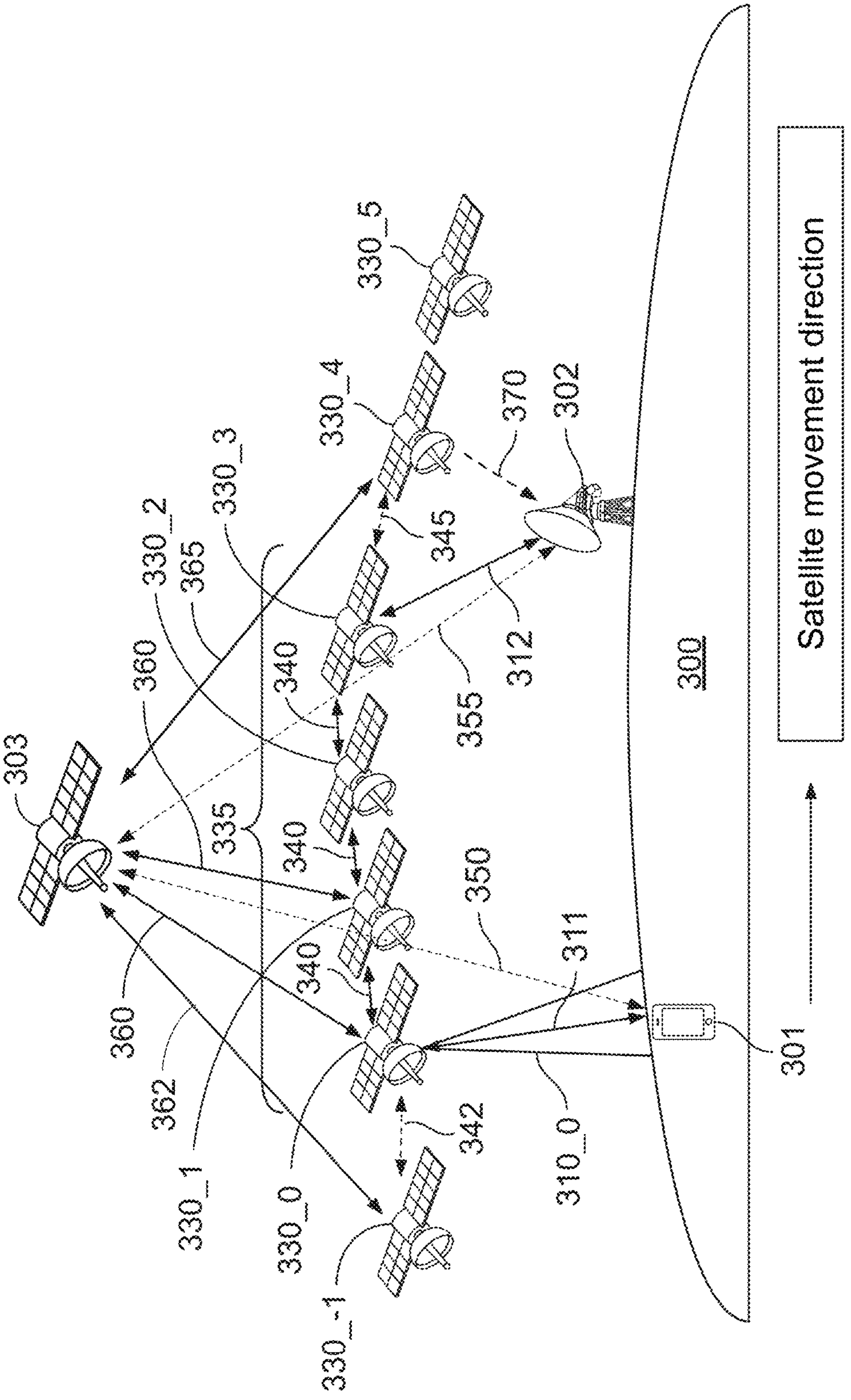
FIGS. 3A and 3B show a system for communication, according to some embodiments of the invention.
Figure 3B:
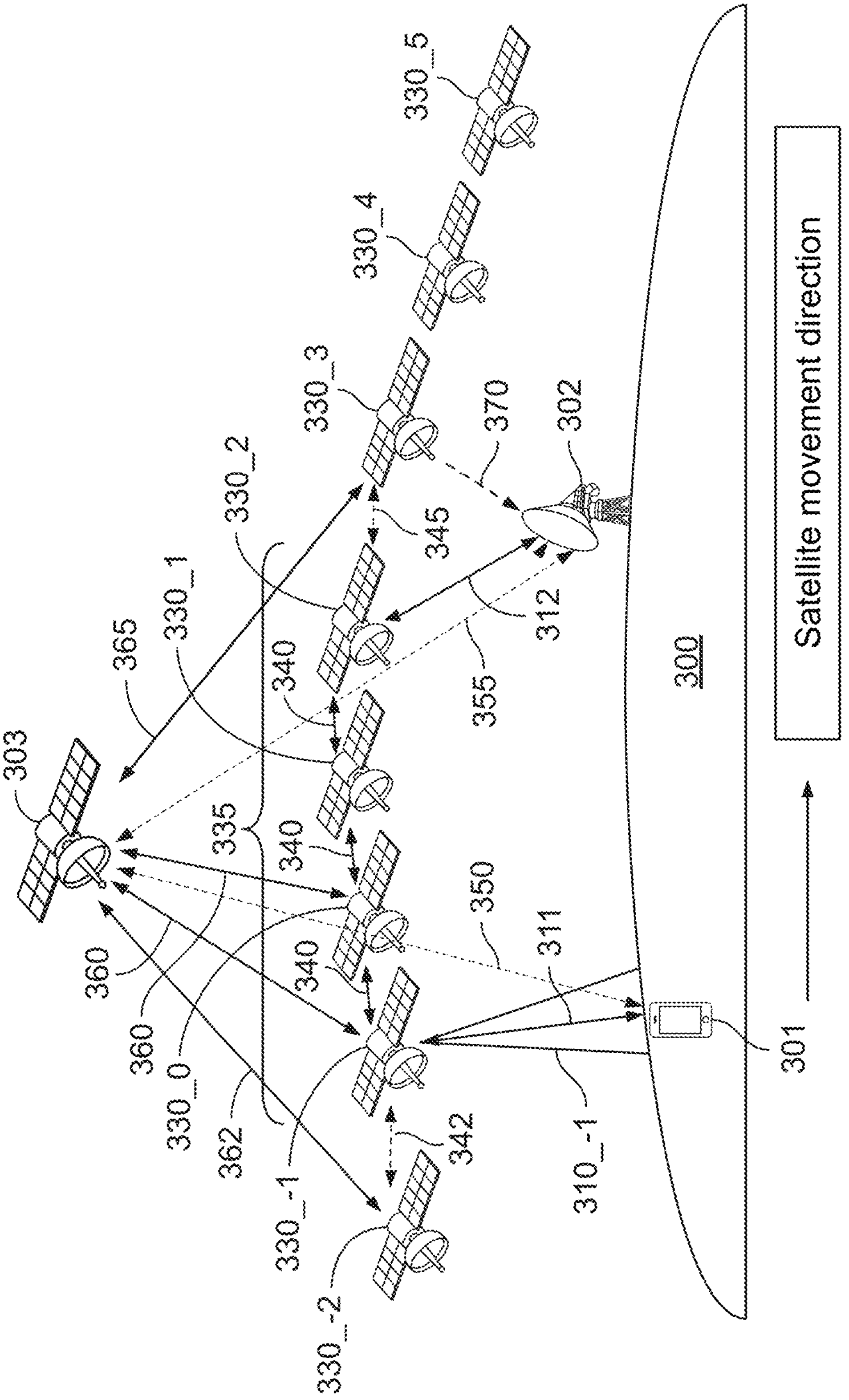

FIGS. 3A and 3B show a system for communication, according to some embodiments of the invention. The system for communication includes a user equipment 301, a terrestrially located core network element 302 such as an AMF (Access and Mobility Management Function), a first satellite 303, and a plurality of second satellites . . . , 330_-2, 330_-1, 330_0, 330_1, 330_2, 330_3, 330_4, 330_5, . . . . The second satellites may be referred to collectively as 330, or 330_n (with n being an index).

Figure 3C:
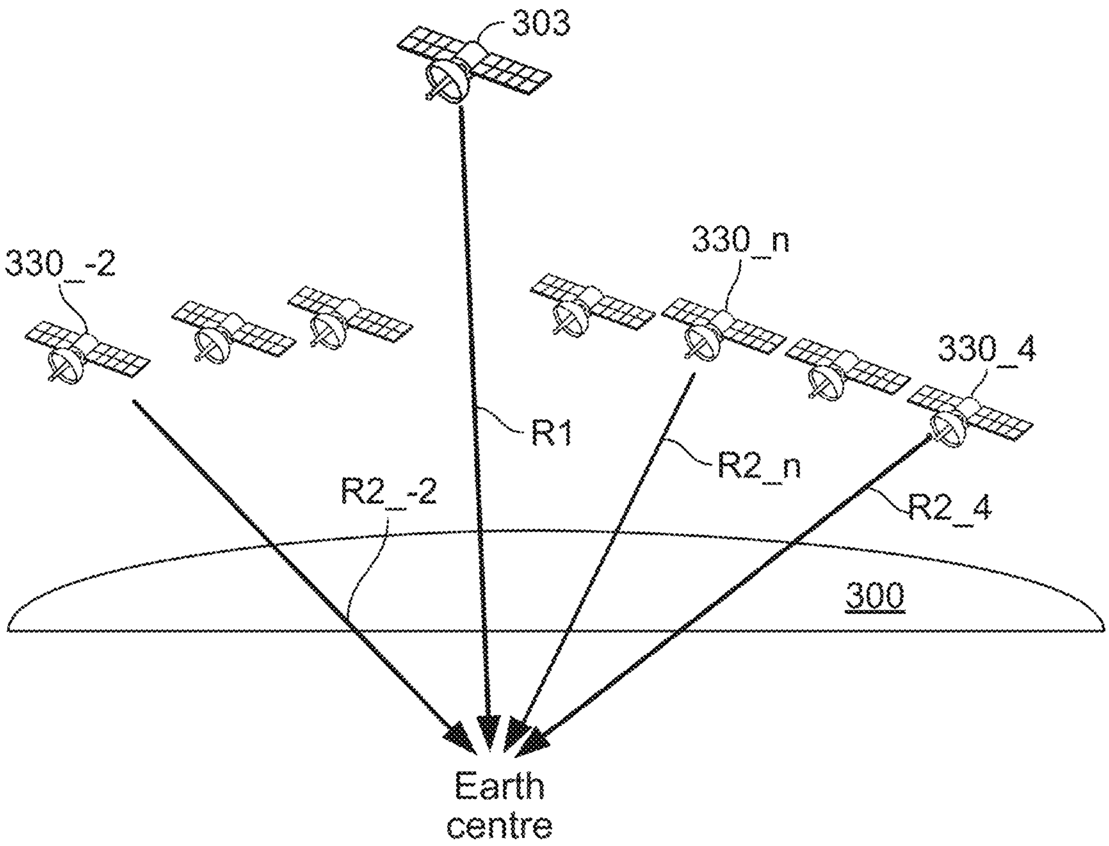
FIG. 3C shows an example representation of first and second radii.

First satellite 303 may be a GEO or LEO satellite, and may be characterised as having a first orbit defined by a first radius R1. For example, in one embodiment, the first satellite may be a LEO satellite with, for example, a first radius greater than 600 km. Radius R1 may be measured from the centre of a planet (e.g. Earth) above which the first satellite is orbiting. Radius R1 may be measured from a surface 300 of the planet (for example with an assumption of a uniform surface). FIG. 3C shows an example representation of first radius R1.

The plurality of second satellites 330_n may be VLEO/VLOS satellites, and may be characterised as each having a second orbit, each second orbit defined by a radius R2_n (where n is the index of the respective second satellite). Each second radius R2_n is less than the first radius R1, such that first satellite 303 is in a "higher" orbit than each of the plurality of second satellites, as shown in FIG. 3C. The plurality of second satellites may all share a common second radius (for example simply denoted R2) e.g. the plurality of second satellites may orbit in the same orbital plane. FIG. 3C shows an example representation of second radii R2_n for satellite 330_-2 (having radius R2_-2) and satellite 330_4 (having radius R2_4). As shown in FIG. 3C, R2_-2<R1 and R2_4<R1. In some embodiments, R2_-2 may equal R2_4 (e.g. some or all R2_n may be equal).

At least two of the plurality of second satellites may be operated by different mobile network providers "MNOs". For example satellites from multiple MNOs may be commandeered (e.g. subject to agreement) to provide greater potential coverage.

As shown in FIG. 3A, first satellite 303 is in communication with (e.g. capable of sending/receiving signals to and from) each of UE 301 and core network element 302. For example, first satellite 303 may send and receive signals 350 to and from user equipment 301, and may send and receive signals 355 to and from core network element 302. First satellite 303 is also in communication with at least some of second satellites 330_n (e.g. those second satellites which are within range of first satellite 303).

First satellite 303 is adapted to perform several steps in response to a setup request received from UE 301. For example, UE 301 may send an SRB1 setup request to first satellite 303 as a primary cell. In particular, first satellite 303 sends the setup request to terrestrially located core network element 302. The UE performs access to satellite 303 as said satellite performs all the necessary routines and emissions (SIB signaling) for being an anchor cell, i.e. the UE can camp on it and execute all authentication requests via the core network via said satellite. The VLOS satellite here, also referred to as a second satellite may be a non-anchor satellite, i.e. does not provide the necessary System information (SIBs for camping and accessing core network via said satellite). First satellite 303 may also handle the initial UE P-RACH (physical random access channel) process since second satellites 330_n may not be suited for P-RACH setup, and it is an aim of the present invention to localize NAS (non-access stratum signaling) handling and core functionality in the more stable higher orbit satellite (e.g. first satellite 303).

First satellite 303 configures, based on a setup configuration received from core network element 302, a sequence 335 of second satellites of the plurality of second satellites according to a coverage area of the sequence of second satellites and a location of UE 301 and core network element 302 with respect to the coverage area. For example, first satellite 303 may configure (e.g. by signals 360, not all shown) second satellites 330_0, 330_1, 330_2, and 330_3 to form a sequence 335 of second satellites. Sequence 335 of second satellites comprises a serving satellite (e.g. 330_0) to serve UE 301. Sequence 335 could optionally include second satellite 330_4 (e.g. configured by first satellite 303 with signal 365), since this satellite is within range of core network element 302 and could provide a backup connection 370 to core network element 302, but embodiments of the invention may seek to maintain a minimal sequence 335 (e.g. comprising as few second satellites as possible) so as to conserve satellite-to-satellite resources and prolong operational lifetime of the satellites.

Sequence 335 of second satellites are adapted to provide a first user data connection between UE 301 and core network element 302. For example, via a number of satellite hops (e.g. a chain of connections) among second satellites in sequence 335, a secondary user date plane within the meaning of 3GPP is created between UE 301 and core network element 302. In case of connection failure between UE 301 and the serving satellite, UE 301 can indicate to first satellite 303 (e.g. via the SRB1) that the secondary cell (e.g. second satellite 330_0) is gone. First satellite 303 may then orchestrate a new sequence for UE 301 and indicate to UE 301 which of the second satellites to use for connection.

In some embodiments, providing the first user data connection between UE 301 and terrestrially located core network element 302 comprises communication via inter-satellite link "ISL" 340 between satellites comprised in the sequence. For example, in FIG. 3A, satellites 330_0, 330_1, 330_2 and 330_3 may communicate via ISL (e.g. communication between 330_0 and 330_1, communication between 330_1 and 330_2 etc.) to provide the first user data connection between UE 301 and core network element 302. Satellite 330_3 is shown as the last link in the sequence, communicating with core network element 302 via signal 312.

It will be understood that depending on the distance between UE 301 and core network element 302, a greater or fewer number of intermediate second satellites in sequence 335 may be required or sufficient to establish a "backlink" to terrestrially located core network element 302.

In some embodiments, at least one of the plurality of second satellites, for example a second satellite in sequence 335, may be a non-anchor cell for UE 301. A non-anchor cell according 3GPP is a cell which is not suited for camping or initial access to be performed by a UE towards the core network, as it does not provide the necessary system information (SIBs) and hence is only used in conjunction of dedicated mode, i.e. included when the UE has an active data session. In some embodiments, first satellite 303 is an anchor cell for UE 301. For example, UE 301 may consider the lower orbit VLOS satellites as secondary cells, i.e. non-anchor cells whilst the UE anchor cell is in the higher orbit. The anchor cell is a cell where the UE assumes SSB, system information and paging are transmitted. The concept of anchor and non-anchor cells exists so far especially for NB-IoT carriers, however in the present context these terms are applied to cells in general, e.g. the VLOS satellites are non-anchor cells. That the second satellites may be provided as non-anchor cells avoids the UE camping on the second satellites, which due to the frequency of handover between VLOS satellites as a consequence of their orbit avoids battery drain of the UE due to frequent idle mode mobility and SIB reading.

The second satellites may just provide PSS-blocks (packet switched streaming) for measurement of connection maintenance, identification and barring indications. No general SIBs for neighbor cells/frequencies or service configurations may be provided. This information can be provided by the (e.g. LEO/GEO) first satellite and depending on UE request and control considerations serving and the so-called "drift" second drift satellites are configured accordingly for handling the user plane by the control network via the first satellite.

In some embodiments, UE 301 is prevented from camping on sequence 335 of second satellites (for example prevented from camping on any of the satellites comprised in the sequence). For example, the VLOS satellites do not provide the necessary system information which would allow for camping, or indicating directly non-anchor/non-camping cell in its PBCH (physical broadcast channel) i.e. MIB master information.

First satellite 303 is further adapted to iteratively update sequence 335 of second satellites based on a changing coverage area of the sequence of second satellites. First satellite 303 does this by being adapted to configure a second satellite of the plurality of second satellites to become a new serving satellite comprised in the sequence when a coverage area of an existing serving satellite no longer includes UE 301. First satellite 303 may also configure a second satellite of the plurality of second satellites having a coverage area which includes the terrestrially located core network element to be comprised in the sequence if no second satellite currently in the sequence has a coverage area which includes the terrestrially located core network element.

For example, as shown in FIG. 3A, sequence 335 of second satellites comprises satellite 330_0, 330_1, 330_2, and 330_3, with satellite 330_0 as the serving satellite serving UE 301. As the satellites move over surface of the Earth 300, the situation in FIG. 3B (and as explained for FIG. 2B) arises where the existing serving satellite 330_0 no longer has a coverage area 310_0 which includes UE 301. However, satellite 330_-1 has moved (e.g. drifted) to have a coverage area 310_-1 which includes UE 301. First satellite 303 may configure satellite 330_-1 to become a new serving satellite serving UE 301. First satellite 303 may do this in advance of a change in the serving satellite (e.g. during a predetermined time before the change), for example first satellite 303 may prepare satellite 330_-1 (e.g. by a configuration 362) to takeover as the serving satellite. Satellite 303_0 may have its status as serving satellite removed (e.g. by a reconfiguration from first satellite 303) and satellite 330_-1 will be considered as being part of sequence 335 of second satellites. Satellite 330_0 may remain in sequence 335 as an intermediate satellite. Such an update of the sequence reflects a handover from satellite 330_0 to satellite 330_-1 as the serving satellite.

At the other "end" of the sequence, satellite 303_4 has moved sufficiently far so as to have a coverage area which no longer includes core network element 302 (e.g. it is no longer in range), and satellite 303_2 has moved sufficiently far to have a coverage area which now includes core network element 302. Satellite 330_2 may be configured by first satellite 303 to communicate (e.g. via signal 312) with core network element 302. Alternatively, since satellite 330_2 was already comprised in sequence 335, no further configuration by first satellite 303 may be required. Satellite 303_4 may be removed from sequence 335 (e.g. by a reconfiguration from first satellite 303), if it was included. Satellite 303_3 still has a coverage area which includes core network element 302, and so may optionally remain in sequence 335, for example as a backup, redundant, or failsafe connection 370 to core network element 202 in case of connectivity issues of second satellite 330_2. For example, satellite 330_3 may be configured/reconfigured by first satellite 303 with signal 365. Accordingly, the updated sequence 335 includes second satellites 330_-1, 330_0, 330_1, 330_2, and optionally 330_3. First satellite 303 may prepare second satellite 330_-2 (e.g. with a configuration 362) to be comprised in sequence 335 after the next update to the sequence once satellite 330_-1 moves out of range of UE 301.

As an example, sequence 335 may be considered as being updated by a cyclic shift of second satellite indices, with 330_-1→330_0, 330_0→330_1, . . . , etc. where 330_0 represents the serving satellite (e.g. index n=0 represents the serving satellite).

It will be understood that whilst the second satellites of FIGS. 3A and 3B are shown as moving from left to right, embodiments of the invention are equally applicable to other movements of the satellites in 3D space, such as represented in a 2D figure by right to left, or into or out of the plane of the page. Further, whilst UE 301 is shown in 2D space as being to the left of core network element 302, other arrangements in 3D space are possible.

In some embodiments, first satellite 303 may configure a second satellite of the plurality of second satellites having a coverage area which includes terrestrially located core network element 302 to be comprised in the sequence. For example, if between FIGS. 3B and 3A the satellites were moving right to left (e.g. a reversal of the direction shown), then first satellite 303 may configure "incoming" satellite 330_4 to be comprised in sequence 335.

In some embodiments, first satellite 303 may maintain a further user data connection with UE 301. The further user data connection may be a "backup" data connection, for example, first satellite 303 may send and receive data to and from UE 301 via such further user data connection if the first user data connection (e.g. as provided by sequence 335 of second satellites) is lost. For example, signal 350 between UE 301 and first satellite 303, and signal 355 between first satellite 303 and core network element 302 may represent such a further user data plane As discussed, the first user data connection may have the functionalities of a secondary user plane, and the further user data connection (between the first satellite and UE) may have the functionalities of a primary user plane.

In some embodiments, first satellite 330 performs non-access stratum (NAS) signaling with UE 301.

In some embodiments, UE 301 monitors first satellite 303 when the UE is in idle mode.

In some embodiments of the invention, the serving satellite may be adapted to perform an inter-satellite hybrid automatic repeat request "HARQ" process. For example, the inter-satellite HARQ process may include sending user data and information related to generating a HARQ redundancy version, by the serving satellite, to an adjacent second satellite of the sequence prior to the coverage area of the serving satellite no longer including the UE. HARQ redundancy versions is a known feature in 3GPP where each transmission is self-decodable but also decodable in case of reception errors in its combinations. Hence some embodiments of the invention relate to an HARQ process which is performed between two satellites, as handovers may occur so frequently and avoids that at each handover the HARQ process of the ongoing transmission must be restarted from scratch. If the new serving satellite is aware of the ongoing HARQ process and the redundancy versions to be received or generated it can in conjunction with the data received from the previous serving satellite maintain and finalize the HARQ process.

As shown in FIGS. 3A and 3B, serving satellite 330_0 may send data 342 related to generating a HARQ redundancy version whilst satellite 330_0 still has a coverage area 310_0 which includes UE 301 and before satellite 330_0 moves such that coverage area 310_0 no longer includes UE 301. Serving satellite 330_0 may send such data 342 to satellite 330_-1 because satellite 330_-1 is an adjacent satellite which is due to become a new serving satellite. Thus the serving satellite may not only provide the data to the user plane but, depending on remaining coverage time, may also forward part of the user data to the next serving satellite to finalize the provisioning in case of errors (e.g. retransmission for the user).

The latency is reduced to 10 ms but handovers and serving satellite change will appear very frequently i.e. having less than a minute or only double-digit seconds for the service a seamless provisioning of data and HARQ process across base stations/satellites is required. An HARQ process may comprise of several retransmissions of the different redundancy version and hence take several double digits of milliseconds. As a consequence, the number of unfinalized HARQ process due to subsequent handover may increase. Hence, restarting each interrupted process may cause delays and hence an inter-satellite HARQ process according to embodiments of the invention may have advantages. For such a process a provisioning of the related information concerning the data and the HARQ process may allow for an increased throughput and a more efficient data session.

Due to the high density of HARQ process interruption some embodiments of the invention provide a new functionality that within a handover process all necessary information to maintain and finalize an ongoing HARQ process are provided during a handover.

Satellites 330_3 and 330_4 may also perform a HARQ process, with satellite 330_3 sharing data 345 related to generating a HARQ redundancy version for communications with core network element 302.

Accordingly, embodiments of the invention address the fast handover speed with such a modified HARQ process which includes data forward making handover more robust, by avoiding handover-interruptions and maintaining ongoing HARQ process and in case of failure occurrence the UE still maintains a smaller connection via higher satellites for connectivity maintenance and avoiding entire radio link failure (RLF).

One embodiment of the invention relates to a satellite adapted to perform the role of a first satellite (such as first satellite 303) as described herein. it will be understood that multiple satellites adapted to perform the role of a first satellite may be deployed to give a large area of coverage over the Earth.

Another embodiment of the invention relates to a satellite adapted to perform the role of a second satellite (such as one of the plurality of second satellites 330_*n*) as described herein. Such a satellite may be part of a constellation of similar satellites.

Figure 4:
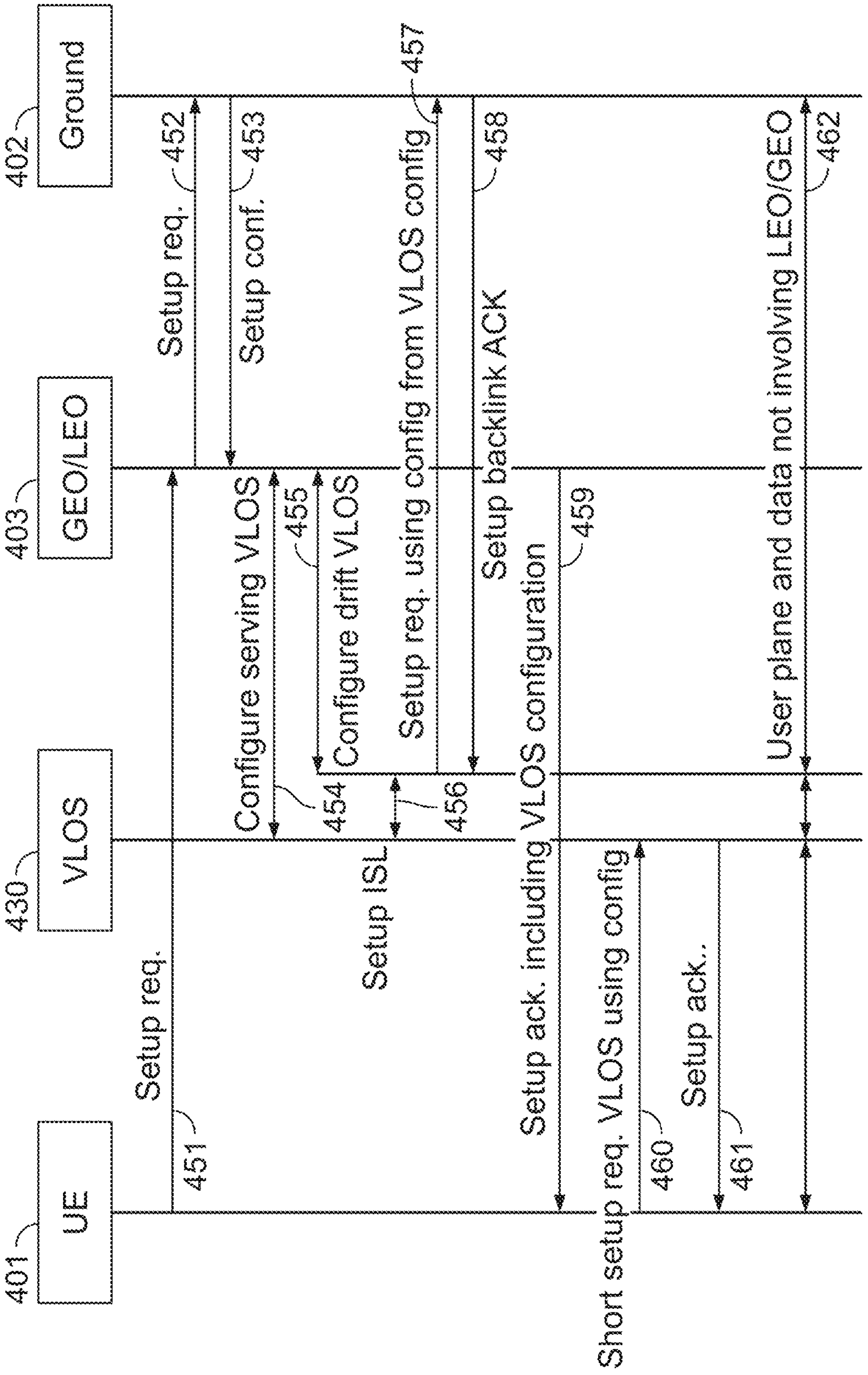
FIG. 4 shows an example schematic of the setup of a connection request, according to some embodiments of the invention.

FIG. 4 shows an example schematic of the setup of a connection request, according to some embodiments of the invention. In FIG. 4, the first satellite is a GEO/LEO satellite, and the plurality of second satellites are VLOS satellites. Ground 402 represents a terrestrially located core network element. Time may be considered as progressing "downwards" in FIG. 4.

In FIG. 4, UE 401 sends a setup request to GEO/LEO satellite 403 (Step 451). Besides UE capabilities (such as the frequency bands used), the setup request may also include UE authentication data and hence drive the rate or service the UE is allowed to receive.

GEO/LEO satellite 403 sends the setup request onwards to ground 402 (Step 452). Ground 402 sends a setup configuration to GEO/LEO satellite 403 (Step 453).

GEO/LEO satellite 403 configures a serving VLOS of VLOS satellites 430 (Step 454), and configures drift VLOS (e.g. updates the serving VLOS when required) (Step 455). For example as was shown in FIG. 3A, first satellite 303 configures second satellite 330_0 as a serving satellite, and may configure second satellite 330_-1 as a drift satellite which will takeover as serving satellite from second satellite 330_0 at a future point in time.

The VLOS satellites 430 establish intersatellite links (ISL) amongst themselves (Step 456). For example as was shown in FIG. 3A, intersatellite links 340 allow second satellites in sequence 335 to form a connection from user equipment to core network element 302. The configured VLOS satellites 430 send a setup request to ground 402 using the configuration from the VLOS configuration (Step 457).

Ground 402 sends an acknowledgement to VLOS satellites 430 that the backlink has been setup (Step 458). GEO/LEO satellite 403 sends a setup acknowledgement including VLOS configuration to UE 401 (Step 459). UE 401 sends a connection request to serving VLOS 430 using the VLOS configuration (Step 460). The serving VLOS sends a setup acknowledgement to UE 401 (Step 461). UE 401 and ground 402 are then connected via a user data plane which does not include GEO/LEO satellite 403 (Step 462).

Figure 5:
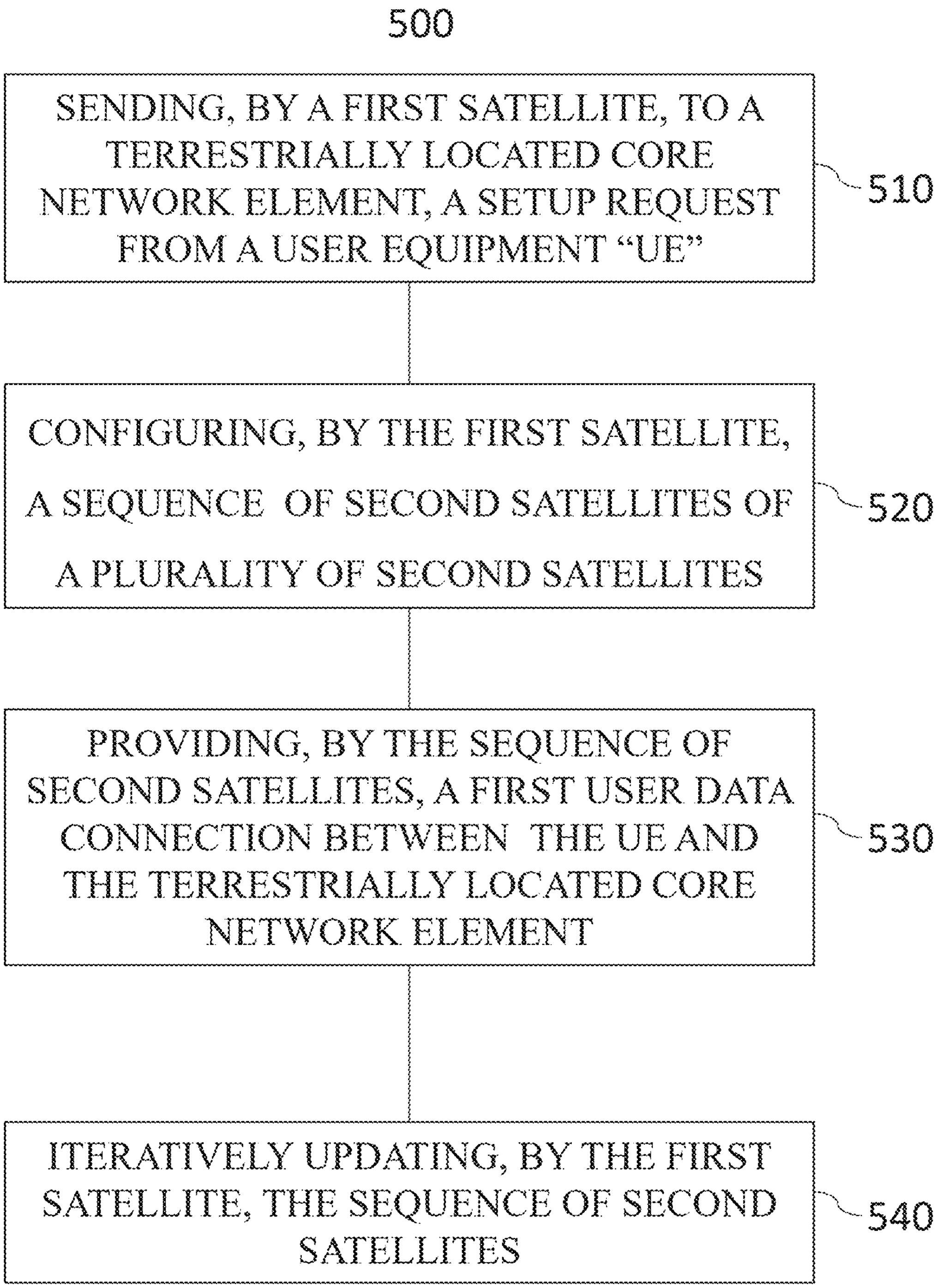
FIG. 5 shows a flowchart of a method for communication, according to some embodiments of the invention.

FIG. 5 shows a flowchart of a method 500 for communication, according to some embodiments of the invention. Method 500 may be performed by a system as shown in FIGS. 3A and 3B.

Method 500 includes sending, by a first satellite, to a terrestrially located core network element, a setup request from a user equipment "UE" (Step 510). For example, a UE (such as UE 301) may send a setup request, such as for setting up an SRB1, to a first satellite (which may be a higher orbit satellite such as an LEO or GEO satellite, such as first satellite 303). The first satellite has a first orbit defined by a first radius (such as R1 as shown in FIG. 3C). The first satellite may be adapted to relay the setup request to a terrestrially located core network element (such as terrestrially located core network element 303).

Method 500 includes configuring, by the first satellite, a sequence of second satellites of a plurality of second satellites (Step 520).

For example, the plurality of second satellites may be a set of VLEO/VLOS satellites (such as a constellation), and the sequence of second satellites may be a subset of satellites of the set of VLEO/VLOS satellites. The plurality of second satellites may be as described for satellites 330_*n* shown in FIGS. 3A-3C. Each satellite 330_*n* of the plurality of second satellites has a second orbit, with each second orbit defined by a second radius (such as radius R2_*n* shown in FIG. 3C), and wherein each second radius is less than the first radius. For example, the first satellite may be a low earth orbit (LEO) satellite or a geosynchronous equatorial orbit (GEO) satellite in a higher orbit than each of the plurality of second satellites. The plurality of second satellites may be very low Earth orbit (VLEO/VLOS) satellites in a lower orbit than the first satellite. The orbits of the second satellites may be the same or may be different, for example several second satellites may orbit in a first orbital plane and several other second satellites may orbit in a second orbital plane. At least two of the plurality of second satellites may be operated by different mobile network providers "MNOs", such that the plurality of second satellites need not all be of the same design.

The sequence of configured second satellites may be a sequence such as sequence 335 shown in FIG. 3A. In particular, the configuring by the first satellite is based on a setup configuration received from the terrestrially located core network element. Configuring the sequence of second satellites of the plurality of second satellites is according to a coverage area of the sequence of second satellites and a location of the UE and/or terrestrially located core network element with respect to the coverage area.

For Example, as shown in FIG. 3A, second satellites 330_0, 330_1, 330_2, and 330_3 have a coverage area which includes UE 301 and core network element 302 and allows connection of UE 301 to core network element 302 (e.g. a total coverage area comprised of individual coverage area 310_0 of satellite 330_0 in combination with ISLs 340 between intermediate satellites 330_1 to 330_3 and connection 312 between satellite 330_3 and core network element 302). These satellites may be configured as the sequence of second satellites 335, which spans a number of satellite hops connecting UE 301 and core network element 302. The sequence of second satellites comprises a serving satellite to serve the UE, for example second satellite 330_0 is a serving satellite in FIG. 3A, having an individual coverage area 310_0 which includes UE 301, and second satellite 330_-1 is a serving satellite in FIG. 3B having an individual coverage area 310_-1 which includes UE 301.

In some embodiments, the sequence of second satellites includes adjacent members of the plurality of second satellites, for example satellites 330_0 to 330_3 as shown in FIG. 3A and satellites 330_-1 to 330_2 as shown in FIG. 3B. Configuring the sequence second satellites by the first satellite may include including or releasing additional satellites for the ISL to reach the ground station or adjusting their configuration.

Method 500 may include providing, by the sequence of second satellites, a user data connection between the UE and the terrestrially located core network element (Step 530). For example, the sequence of second satellites may provide a user data connection which has the functionality of a primary user plane connection. In FIG. 3A, the user data connection/primary user plane connection comprises: UE 301 sending/receiving signals 311 to/from second satellite 330_0; second satellite 330_0 communicating, e.g. via inter-satellite link 340, with second satellite 330_1; second satellite 330_1 communicating, e.g. via inter-satellite link 340, with second satellite 330_2; second satellite 330_2 communicating, e.g. via inter-satellite link 340, with second satellite 330_3; and second satellite 330_3 sending/receiving signals 312 to/from core network element 302.

Method 500 may include iteratively updating, by the first satellite, the sequence of second satellites based on a changing coverage area of the sequence of second satellites (Step 540). The updating includes configuring a second satellite comprised in the sequence to become a new serving satellite when a coverage area of an existing serving satellite no longer includes the UE. For example, as shown in FIGS. 3A and 3B, sequence 335 of second satellites is updated to account for a changing coverage area of second satellite 330_0, which is the serving satellite in FIG. 3A. Sequence 335 in FIG. 3A includes satellites 330_0, 330_1, 330_2, and 330_3. As satellite 330_0 orbits away from UE 301, satellite 330_-1 may be configured by higher orbit first satellite 303 to takeover as the serving satellite, and so, in FIG. 3B, sequence 335 has been updated by first satellite 303 to include satellite 330_-1 (the new serving satellite), satellite 330_0, 330_1, and 330_2. Satellite 330_3 may be removed from the updated sequence so as to maintain a minimal sequence (and thereby conserve satellite resources and prolong operational lifetime) or may be retained so as to provide a backup connection to core network element 302.

The updating may further include configuring a second satellite of the plurality of second satellites having a coverage area which includes the terrestrially located core network element to be comprised in the sequence. For example, at the "tail end" of the sequence, as satellite 330_4 orbits away from the terrestrially located core network element, the higher orbit first satellite may configure satellite 330_1 to communicate with core network element 302 since satellite 330_1 is orbiting towards the terrestrially located core network element. The terminology "drift satellite" may be used to refer to a satellite which is not a serving satellite, but which is next in the sequence and due to have its respective coverage area "drift" into an area of coverage for the UE or core network element.

In the example shown in FIGS. 3A and 3B, since the satellite moving direction is left to right, satellite 330_1 was already in sequence 335 shown in FIG. 3A and sequence 335 shown in FIG. 3B. However it will be understood that if the satellite moving direction shown in FIGS. 3A and 3B were reversed (and FIG. 3A is at a later point in time than FIG. 3B), first satellite 303 would need to update sequence 335 such that satellite 330_4 was added to sequence 335 as satellite 330_3 moves out of range of core network element 302, and as satellite 330_4 moves into range of core network element 302. A similar process happens at the other end of the sequence, with satellite 330_-1 leaving as serving satellite and satellite 330_0 taking over as serving satellite due to the location of the UE with respect to the respective coverage areas 310_-1 and 310_0 of satellites 330_-1 and 330_0.

Figure 6:
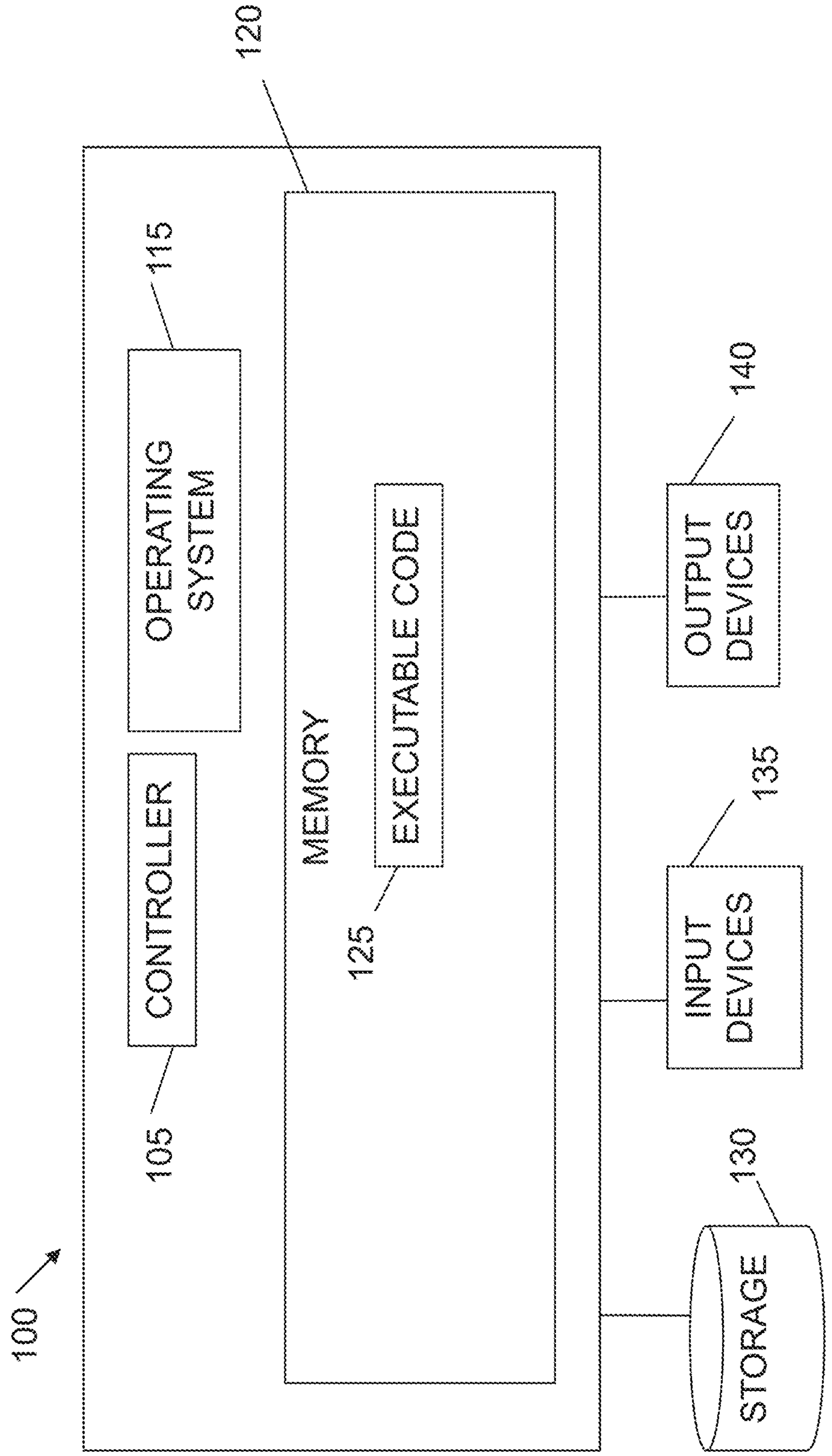
FIG. 6 shows a block diagram of an exemplary computing device which may be used with some embodiments of the present invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 6 shows a block diagram of an exemplary computing device 100 which may be used with some embodiments of the present invention. For example, one or more of first or second satellites 303, 330_*n* as described herein may include a computing device 100 according to FIG. 6. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. At least a portion of Memory 120 may include data storage housed online on the cloud. Memory 120 may be or may include a plurality of different memory units. Memory 120 may store for example, instructions (e.g., code 125) to carry out a method as disclosed herein. Memory 120 may use a datastore, such as a database.

Executable code 125 may be any application, program, process, task, or script. Executable code 125 may be executed by controller 105 possibly under control of operating system 115. For example, executable code 125 may be, or may execute, one or more applications performing methods as disclosed herein, such as method 500 shown in FIG. 5. In some embodiments, more than one computing device 100 or components of device 100 may be used. One or more processor(s) 105 may be configured to carry out embodiments of the present invention by, for example, executing software or code.

Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105. Storage 130 may include cloud storage. Storage 130 may include storing data in a database.

Input devices 135 may be or may include a mouse, a keyboard, a touch screen or pad or any suitable input device or combination of devices. Input devices 135 may include a receiver, such as an antenna receiver. Output devices 140 may include one or more displays, speakers and/or any other suitable output devices or combination of output devices. Output devices 140 may include a transmitter, such as an antenna transmitter. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g., memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

It is anticipated that embodiments of the invention may have an impact on existing or future non-terrestrial network telecommunications architecture and associated standards. For example, embodiments of the invention may be employed in, beyond 5G, 6G and future NTN architectures. The ongoing development of these standards, and the conceptualization and implementation of future standards, may rely on systems and/or methods of the present invention.

For example, embodiments of the invention may extend the capabilities of the 3GPP and/or 6G standards in that a higher orbit satellite and a sequence of satellites in a lower orbit provide control and user plane separation which balances high data throughput with connection stability. The higher orbit satellite provides core functionality and orchestrates the lower orbit satellites for providing the user data plane between the user equipment and core network element. The lower orbit satellites effectively operate merely as data pumps, with the higher orbit satellite handling connection control and configuration, and as such the lower orbit satellites may only be used when the UE is operating in connected mode. Accordingly, the lower orbit satellites do not need to perform non-access stratum signaling procedures such as paging while the UE is in idle mode.

Unless specifically stated otherwise, as apparent from the foregoing discussion, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may include an article such as a computer or processor readable non-transitory storage medium, such as for example a memory, a disk drive, or a USB flash memory encoding, including, or storing instructions, e.g., computer-executable instructions, which when executed by a processor or controller, cause the processor or controller to carry out methods disclosed herein.

It should be recognized that embodiments of the invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment. While the invention has been described with respect to a limited number of embodiments, it should be understood by a person of ordinary skill in the art that one or more features from one particular embodiment or group of embodiments may be combined with features of another embodiment or group of embodiments.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purposes only.

It is to be understood that the details set forth herein do not construe a limitation to an application of the invention.

It is to be understood that the terms "including", "comprising", "consisting" and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "may" or "could" be included, that a particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The invention claimed is:

1. A method for communication, the method comprising:

sending, by a first satellite, to a terrestrially located core network element, a setup request from a user equipment "UE";

configuring, by the first satellite and based on a setup configuration received from the terrestrially located core network element, a sequence of second satellites of a plurality of second satellites according to a coverage area of the sequence of second satellites and a location of the UE and the terrestrially located core network element with respect to the coverage area, the sequence of second satellites comprising a serving satellite to serve the UE;

providing, by the sequence of second satellites, a first user data connection between the UE and the terrestrially located core network element; and iteratively updating, by the first satellite, the sequence of second satellites based on a changing coverage area of the sequence of second satellites, wherein the updating comprises configuring a second satellite of the plurality of second satellites to become a new serving satellite comprised in the sequence when a coverage area of an existing serving satellite no longer includes the UE, and configuring a second satellite of the plurality of second satellites having a coverage area which includes the terrestrially located core network element to be comprised in the sequence if no second satellite currently in the sequence has a coverage area which includes the terrestrially located core network element, wherein the first satellite has a first orbit defined by a first radius, and wherein each satellite of the plurality of second satellites has a second orbit, each second orbit defined by a second radius, wherein each second radius is less than the first radius.

2. The method of claim 1, wherein the plurality of second satellites are very low earth orbit "VLEO" satellites.

3. The method of claim 1, wherein the first satellite is one of: a low earth orbit "LEO" satellite, or a geosynchronous equatorial orbit "GEO" satellite.

4. The method of claim 1, comprising maintaining, by the first satellite, a further user data connection with the UE, and sending data via the further user data connection if the first user data connection is lost.

5. The method of claim 4, wherein the first user data connection has the functionalities of a secondary user plane and the further user data connection has the functionalities of a primary user plane.

6. The method of claim 1, comprising preventing camping of the UE on the sequence of second satellites.

7. The method of claim 1, wherein the first satellite is an anchor cell for the UE.

8. The method of claim 1, wherein at least one second satellite of the plurality of second satellites is a non-anchor cell for the UE.

9. The method of claim 1, comprising performing, by the first satellite, non-access stratum signaling "NAS" with the UE.

10. The method of claim 1, wherein providing the first user data connection between the UE and the terrestrially located core network element comprises communication via inter-satellite link "ISL" between satellites comprised in the sequence.

11. The method of claim 10, comprising performing an inter-satellite hybrid automatic repeat request "HARQ" process, the inter-satellite HARQ process comprising sending user data and information related to generating a HARQ redundancy version, by the serving satellite, to an adjacent second satellite of the sequence prior to the coverage area of the serving satellite no longer including the UE.

12. The method of claim 1, comprising monitoring, by the UE, the first satellite when the UE is in idle mode.

13. The method of claim 1, wherein at least two of the plurality of second satellites are operated by different mobile network providers "MNOs".

14. A system for communication, the system comprising:

a user equipment "UE";

a first satellite having a first orbit defined by a first radius;

a plurality of second satellites each having a second orbit, each second orbit defined by a second radius, wherein each second radius is less than the first radius; and a terrestrially located core network element, wherein the first satellite is adapted to, in response to a setup request from the UE:

send the setup request to the terrestrially located core network element; and configure, based on a setup configuration received from the terrestrially located core network element, a sequence of second satellites of the plurality of second satellites according to a coverage area of the sequence of second satellites and a location of the UE and terrestrially located core network element with respect to the coverage area, the sequence of second satellites comprising a serving satellite to serve the UE, wherein the sequence of second satellites is adapted to provide a first user data connection between the UE and the terrestrially located core network element, and wherein the first satellite is further adapted to:

iteratively update the sequence of second satellites based on a changing coverage area of the sequence of second satellites, by configuring a second satellite of the plurality of second satellites to become a new serving satellite comprised in the sequence when a coverage area of an existing serving satellite no longer includes the UE, and configuring a second satellite of the plurality of second satellites having a coverage area which includes the terrestrially located core network element to be comprised in the sequence if no second satellite currently in the sequence has a coverage area which includes the terrestrially located core network element.

* * * * *